(12) United States Patent
Ronen et al.

(10) Patent No.: US 9,554,292 B2
(45) Date of Patent: Jan. 24, 2017

(54) METHODS AND SYSTEMS FOR PERFORMANCE MONITORING FOR MOBILE APPLICATIONS

(71) Applicant: Google Inc., Mountain View, CA (US)

(72) Inventors: Ofer Ronen, Dublin, CA (US); Keith Simmons, Redwood City, CA (US)

(73) Assignee: Google Inc., Mountain View, CA (US)

( * ) Notice: Subject to any disclaimer, the term of this patent is extended or adjusted under 35 U.S.C. 154(b) by 230 days.

(21) Appl. No.: 14/320,872

(22) Filed: Jul. 1, 2014

(65) Prior Publication Data

US 2015/0019715 A1 Jan. 15, 2015

Related U.S. Application Data

(60) Provisional application No. 61/957,800, filed on Jul. 12, 2013, provisional application No. 61/958,140, filed on Jul. 22, 2013.

(51) Int. Cl.

| | |
|---|---|
| *G06F 15/16* | (2006.01) |
| *H04W 24/08* | (2009.01) |
| *G06F 17/22* | (2006.01) |
| *G06F 9/50* | (2006.01) |
| *H04L 29/08* | (2006.01) |
| *H04W 4/00* | (2009.01) |
| *A63F 13/77* | (2014.01) |
| *A63F 13/537* | (2014.01) |

(52) U.S. Cl.
CPC .............. *H04W 24/08* (2013.01); *G06F 9/505* (2013.01); *G06F 17/2247* (2013.01); *H04L 67/10* (2013.01); *H04W 4/003* (2013.01); *A63F 13/537* (2014.09); *A63F 13/77* (2014.09)

(58) Field of Classification Search
USPC ........... 463/31; 715/760, 781, 786; 718/100; 709/203, 224
See application file for complete search history.

(56) References Cited

U.S. PATENT DOCUMENTS

| | | | |
|---|---|---|---|
| 2009/0049443 A1* | 2/2009 | Powers | H04L 67/10 718/100 |
| 2011/0302510 A1* | 12/2011 | Harrison | G06F 17/2247 715/760 |
| 2013/0059657 A1* | 3/2013 | Olomskiy | A63F 13/00 463/31 |

* cited by examiner

*Primary Examiner* — Kyung H Shin
(74) *Attorney, Agent, or Firm* — Wolfe-SBMC

(57) ABSTRACT

The present invention is directed towards methods and systems for performance monitoring for mobile applications. In an embodiment, a method of monitoring performance of a mobile application is provided. A mobile application is operated on a wireless mobile device. A progress indicator being displayed on a display screen of the mobile device during operation of the mobile application on the wireless mobile device is automatically detected. Data indicative of a time duration of the progress indicator is obtained. The data indicative of the time duration is communicated to a centralized server.

23 Claims, 8 Drawing Sheets

METHODS AND SYSTEMS FOR PERFORMANCE MONITORING FOR MOBILE APPLICATIONS

This application claims the benefit of U.S. Provisional Application No. 61/957,800, filed Jul. 12, 2013, and claims the benefit of U.S. Provisional Application No. 61/958,140, filed Jul. 22, 2013, the entire contents of all of which are hereby incorporated by reference.

BACKGROUND OF THE INVENTION

The present invention relates to the field of wireless mobile devices and software applications installed thereon. More particularly, the present invention relates to monitoring performance of such devices and software applications.

According to a study by Equation Research, slow performance is the top complaint users have with mobile device applications.

Performance of a website can be analyzed by monitoring the network delay associated with loading web pages and comparing the average delay to that of other websites. A percentile can then be reported that helps website developers determine how their website performs compared to other websites. Companies such as New Relic provide website monitoring services. Such website performance monitoring services, however, are not readily applicable to monitoring performance of mobile applications.

In an attempt to address the issue of slow performance of mobile applications, Compuware offers a solution that allows mobile application developers to manually configure their mobile applications to measure wait times by manually indicating the beginning and end of sections of mobile application code for which wait time is to be measured. Reporting the wait time helps mobile application developers identify portions of their application code that require optimization. It can, however, be time-consuming and cumbersome to initially configure an application to obtain these measurements and to maintain the application on an ongoing basis as changes are made to the application.

What is needed, therefore, are improved techniques for monitoring performance of mobile applications.

SUMMARY OF THE INVENTION

The present invention is directed towards methods and systems for performance monitoring for mobile applications. In an embodiment, a method of monitoring performance of a mobile application is provided. A mobile application is operated on a wireless mobile device. A progress indicator being displayed on a display screen of the mobile device during operation of the mobile application on the wireless mobile device is automatically detected. Data indicative of a time duration of the progress indicator is obtained. The data indicative of the time duration is communicated to a centralized server.

In accordance with another embodiment, method of monitoring performance of a mobile application is provided. A first mobile application is installed on a plurality of wireless mobile devices. Performance data resulting from operating the first mobile application on the plurality of mobile devices is collected. A second mobile application is installed on at least one mobile device. Performance data resulting from operating the second mobile application on the at least one mobile device is collected. Relative performance of the second mobile application is compared to performance of the first mobile application using the performance data resulting from operating the first mobile application on the plurality of mobile devices and the performance data resulting from operating the second mobile application on the at least one mobile device. Results of said comparing relative performance is provided via a computer network.

These and other embodiments are described herein.

BRIEF DESCRIPTION OF THE DRAWINGS

The present invention is described with respect to particular exemplary embodiments thereof and reference is accordingly made to the drawings in which.

DETAILED DESCRIPTION OF A PREFERRED EMBODIMENT OF THE INVENTION

Figure 1:
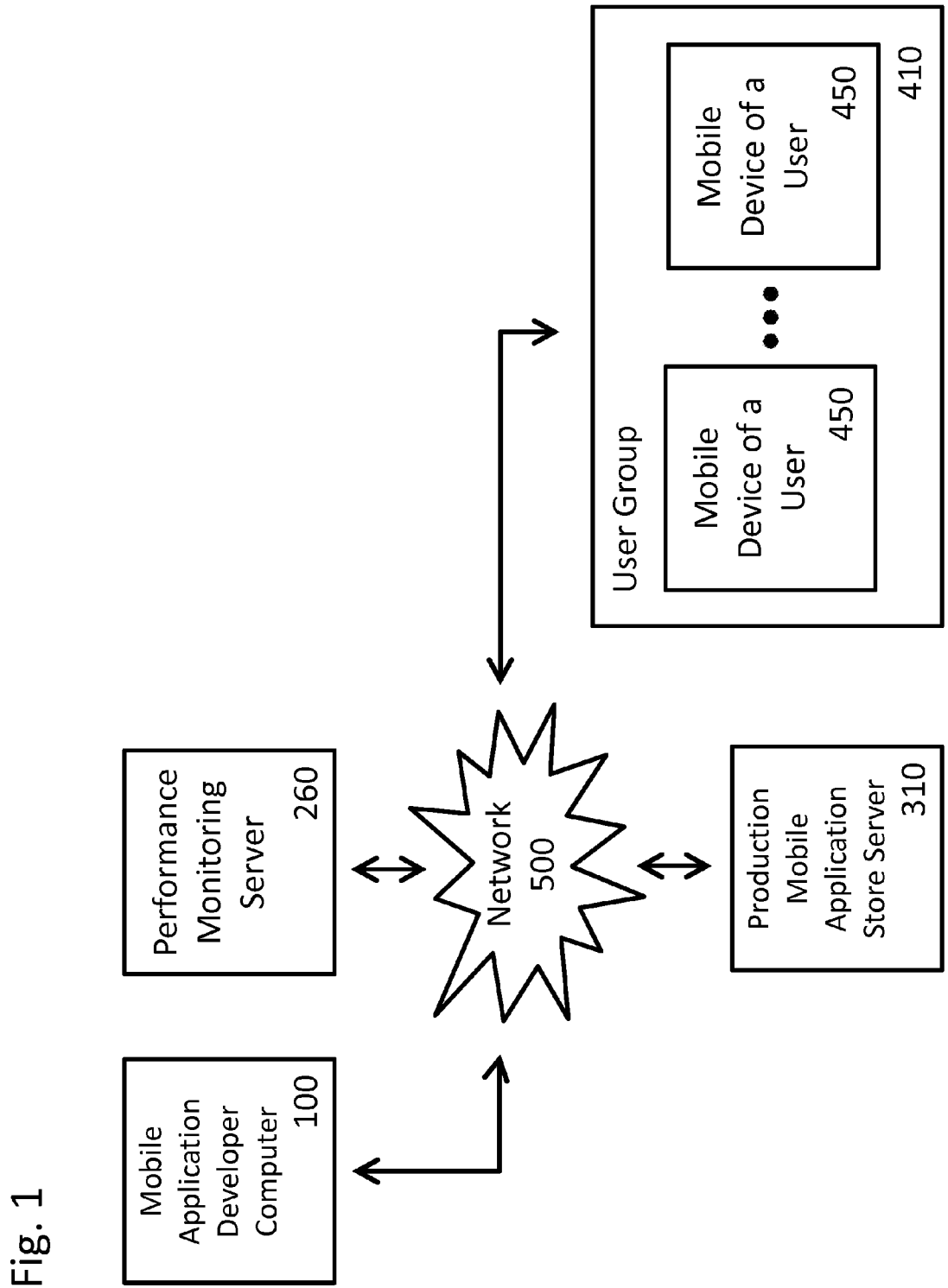
FIG. 1 illustrates a system for monitoring mobile application performance in accordance with an embodiment of the present invention.

The present invention is directed toward monitoring performance of mobile devices and software applications operating on such mobile devices. In accordance with an embodiment of the present invention, instances within a mobile application during which users of the mobile application are waiting on the mobile application are automatically discovered. Specifically, instances in which the user is waiting on a progress indicator can be automatically discovered within the mobile application and instrumented. Such progress indicators are also known as activity indicators, progress bars or, more simply, "spinners." Typically, such progress indicators are displayed on a display screen of the mobile device while the user is awaiting some action or function to be completed by the mobile application. Such actions can include displaying an image or processing a transaction. A mobile application is modified by adding instrumentation that performs performance monitoring functions described herein. Thus, instrumentation can be accomplished by adding monitoring instrumentation during code run-time, during code compilation, or both. Once instrumented, the time users wait on progress indicators can be determined and analyzed. Results can be reported to a mobile application developer. Causes of wait times can include, for example, issues related to the mobile handset's memory usage, the mobile handset's processor, network connection, network delay, disk access delay, battery drain, slow function runtimes and so forth. Context in which the wait times occur can be reported, for example, a portion of the mobile application being executed at the time may be identified, the last user input prior to the slow frame rate event may be identified or the type of activity occurring during the wait time, e.g., loading an image or awaiting a response from a subroutine or remote transaction server.

Thus, embodiments of the present invention are directed toward automated techniques for monitoring the wait time experienced by users of mobile handset applications. Instances of a progress indicator being loaded in a mobile application are automatically identified. Then, during operation of the application on a set of mobile devices, information regarding the times that users waited on the progress indicators within the application is monitored and reported. Information relevant to the causes of the wait times, such as the context in which the progress indicator occurred, can also be reported.

Embodiments of the present invention are directed toward benchmarking the performance of mobile applications. Specifically, performance of different types of actions in mobile applications can be monitored and compared to actions in other mobile applications.

Actions that can be monitored for performance and benchmarked can include, for example, wait times during display of progress indicators, response times for scrolling actions or buttons being pressed or other user input gestures which then initiate activity by the mobile application. Users of mobile applications tend to expect different response times for different actions. For example a scrolling action in an application is expected to be smooth and thus generally requires shorter response times than a button click in a mobile application. It can be useful to benchmark various different types of actions such as scrolling, flipping, swiping, and clicking on buttons or links. Each such action type can have an expected response time. Average response times, and response time percentiles can be discovered from various mobile applications and used to benchmark the responsiveness of an application per user action type. Performance data used for benchmarking can be obtained by automatic instrumentation, for example, to detect wait times associated with progress indicators as described herein. Performance data can also be obtained via manual methods such as by manually adding instrumentation to the application code in order to collect performance data.

Furthermore, depending on the usage level of different action types in an application, an overall application performance benchmark can be determined by combining individual performance benchmarks. For example, if an application has two actions, scrolling and button pressing, with the scroll action happening 50% of the time compared to the button press action, and the scrolling responsiveness was in the $80^{th}$ percentile compared to other applications and button pressing in the $50^{th}$ percentile, then a weighted average benchmark could place the application in the $65^{th}$ percentile. Alternatively, the performance of a mobile application can be benchmarked based on the total wait time experienced by users of the application compared to other mobile handset applications.

In addition, to help improve performance benchmarks, circumstances that cause wait times or context in which the wait time occurs can be discovered and reported to the application developer. Such cause can include, for example, issues related to the mobile handset's memory usage, the mobile handset's processor, network connection, network delay, disk access delay, battery drain, slow function runtimes and so forth. Context in which the wait times occur can be reported, for example, a portion of the mobile application being executed at the time may be identified, the last user input prior to the slow frame rate event may be identified or the type of activity occurring during the wait time, e.g., loading an image or awaiting a response from a subroutine or remote transaction server.

FIG. 1 illustrates a system for monitoring mobile application performance in accordance with an embodiment of the present invention. The system of FIG. 1 includes a mobile application developer computer 100, a performance monitoring server 260, a communication network 500, a mobile application store server 310, user group 410, and mobile devices 450. The network 500 can include, for example, the Internet, a Wi-Fi network, a cellular network, and/or other types of networks. A mobile application developer can use the computer 100 to access the performance monitoring server 260 over the network 500. The developer can be an individual or a juristic entity such as a corporation. The developer computer 100 downloads a performance library and then includes and instantiates the performance library in a mobile application being developed by the developer. The application developer computer 100 can then upload over the network 500 to the production mobile application store server 310 the application with the performance library included. A mobile device user 450 can then connect over the network 500 to the production mobile application store server 310 to download the application to a mobile device 450. The mobile device 450 can run the mobile application and also collect resulting performance data for the mobile application. The mobile device 450 can connect to the performance monitoring server 260 via the network 500 to send application performance data that is collected by the device 450.

Figure 2:
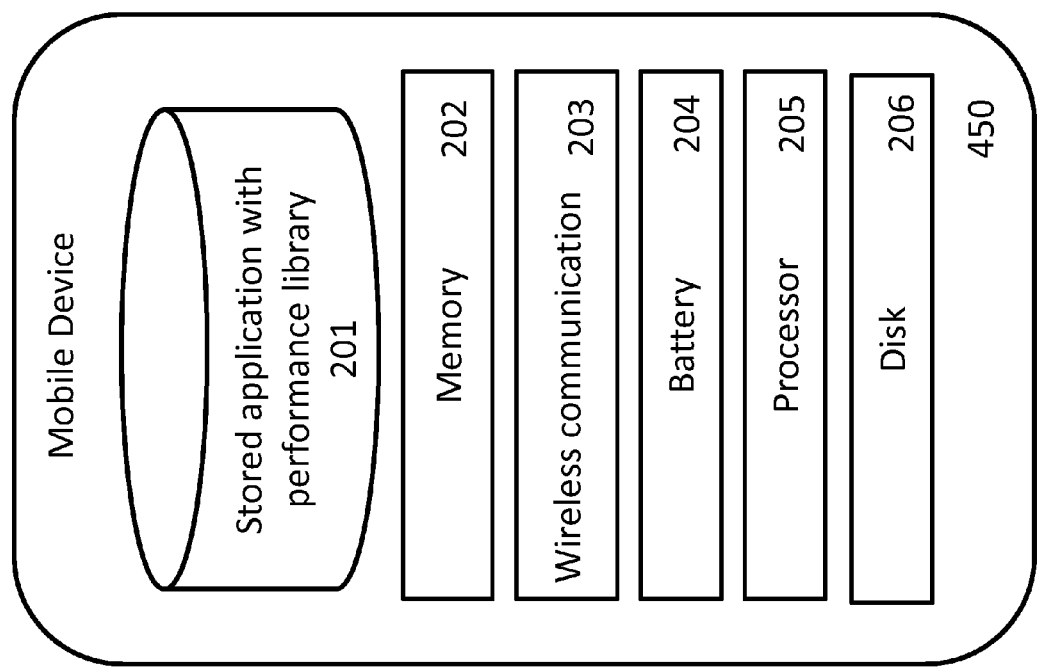
FIG. 2 illustrates the mobile device and its relevant components in accordance with an embodiment of the present invention.

FIG. 2 illustrates a mobile device and its relevant components in accordance with an embodiment of the present invention. More specifically, FIG. 2 illustrates the mobile device 450 having a mobile application with an included performance library 201 stored within the mobile device 450. The mobile device 450 further includes memory 202, wireless communication 203, battery 204, processor 205, and disk 206. The performance library monitors the performance of the application which can include monitoring performance during any progress indicator wait times. The performance library can also monitor other performance data or indicators, for example, response times for various different types of actions including scrolling, flipping, swiping, and clicking on buttons or links. U.S. patent application Ser. No. 14/243,783, filed Apr. 2, 2014, and U.S. patent application Ser. No. 14/257,797, filed Apr. 21, 2014, both of which are hereby incorporated by reference in their entireties, each describes performance parameters that can be collected and processed in accordance with the present invention.

The performance library can be included in the mobile application by the developer 100, as described in connection with FIG. 4. It will be apparent to those skilled in the art that such a performance library can be developed for mobile applications to automatically collect performance information while progress indicators are displayed to users without significantly affecting performance of the mobile device and its application that contains the performance library.

As an example, the performance library 201 can monitor during the progress indicator wait time per type of mobile device 450 and operating system version, the memory 202 allocated per function used by the mobile application, and the maximum memory 202 that is used by the application per user session relative to the total available memory per type of mobile device 450. The performance library 201 can also monitor the wireless communication 203 to measure the duration of network requests made from the application whose performance can be negatively affected by slow network connections, by large amounts of data that mobile users download, or by type of mobile device 450. The performance library 201 can monitor the disk lag 206 per type of mobile device 450 type. The performance library 201 can monitor the amount that the application drains the battery 204 per type of mobile device 450 type. The performance library 201 can monitor the processor 205 to measure the run-time per function call in the application per type of mobile device 450.

Figure 3:
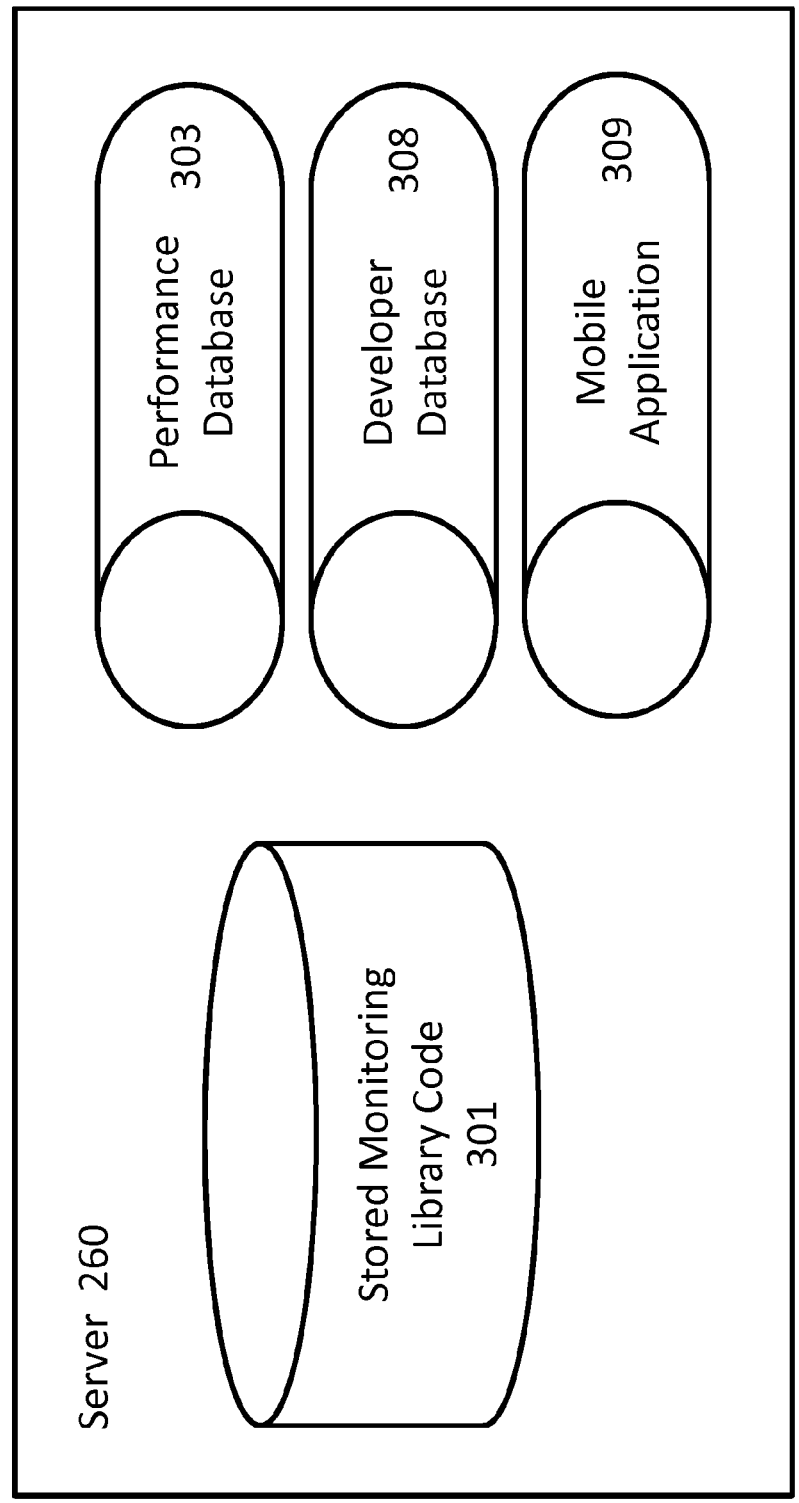
FIG. 3 illustrates a performance monitoring server in accordance with an embodiment of the present invention.

FIG. 3 illustrates a performance monitoring server in accordance with an embodiment of the present invention. As shown in FIG. 3, the performance monitoring server 260 includes a stored performance library code 301, a performance database 303, a developer database 308 and a mobile application database 309. The database 303 stores data received by the server 260 from the mobile devices 450 in the user group 410. The developer database 308 can store unique identifiers for developers and possibly also contact information for each developer, such as name, address, and email address. The mobile application database 309 can store the mobile applications of each developer. Each mobile application in the mobile application database 309 is preferably associated with the developer's unique name or other identifier from the developer database 308 and preferably also includes an application name and description.

Performance data stored in the performance database 303 is preferably associated with the particular application and action within the application to which data pertains. For example, the performance database 303 preferably stores the performance data along with a developer identifier from the developer 308 database, as well as the application identifier from the mobile application 309 database for which the performance monitoring data is collected. In the case of progress indicators, the performance data is preferably associated with a progress indicator name or other identifier which may also be reported to the server 260. In addition, the progress indicator can be associated with various combinations of the following information which may also be reported to the server 260 in connection with the progress indicator: the type of mobile device 450 that data is collected on, its operating system version and type, its geographical location, its wireless network connection type, carrier name, a user action name, such as checkout button, a user action type such as a button press, a total runtime of the user action. Rather than the total runtime or in addition to the total runtime, start and stop timestamps associated with the progress indicator can be stored. The total runtime can then be determined from the start and stop timestamps. The performance data can also include performance measures for the user action including performance for the memory 202 (e.g. memory usage), wireless communication 203 (e.g. communication latency or delay), battery 204 (e.g. battery usage or drain), processor 205 (e.g. processor speed or response time), and disk 206 (e.g. disk access delay or latency). Capturing of the performance monitoring data 303 per user action in connection with progress indicators is described in connection with FIG. 5.

In an embodiment, the performance database 303 can also capture and store instances when the frame rate for the mobile application is below a certain threshold. For example, the duration of time that the frame rate falls below five frames per second can be determined and stored. Each instance of low frame rate can be associated with a user action if it occurs during a time period when the mobile application is responding to a user action. Such instances of low frame rate can alternatively be associated with some other activity occurring during operation of the mobile application. Otherwise the instance of low frame rate is not associated with a user action or other specified activity but can be associated with the mobile application generally. In addition, the low frame rate occurrence can be associated with various combinations of the following information which may also be reported to the server 260 in connection with the low frame rate occurrence: the type of mobile device 450 that data is collected on, its operating system version and type, its geographical location, its wireless network connection type, carrier name, a user action name, such as checkout button, a user action type such as a button press, a total runtime of the user action.

Figure 4:
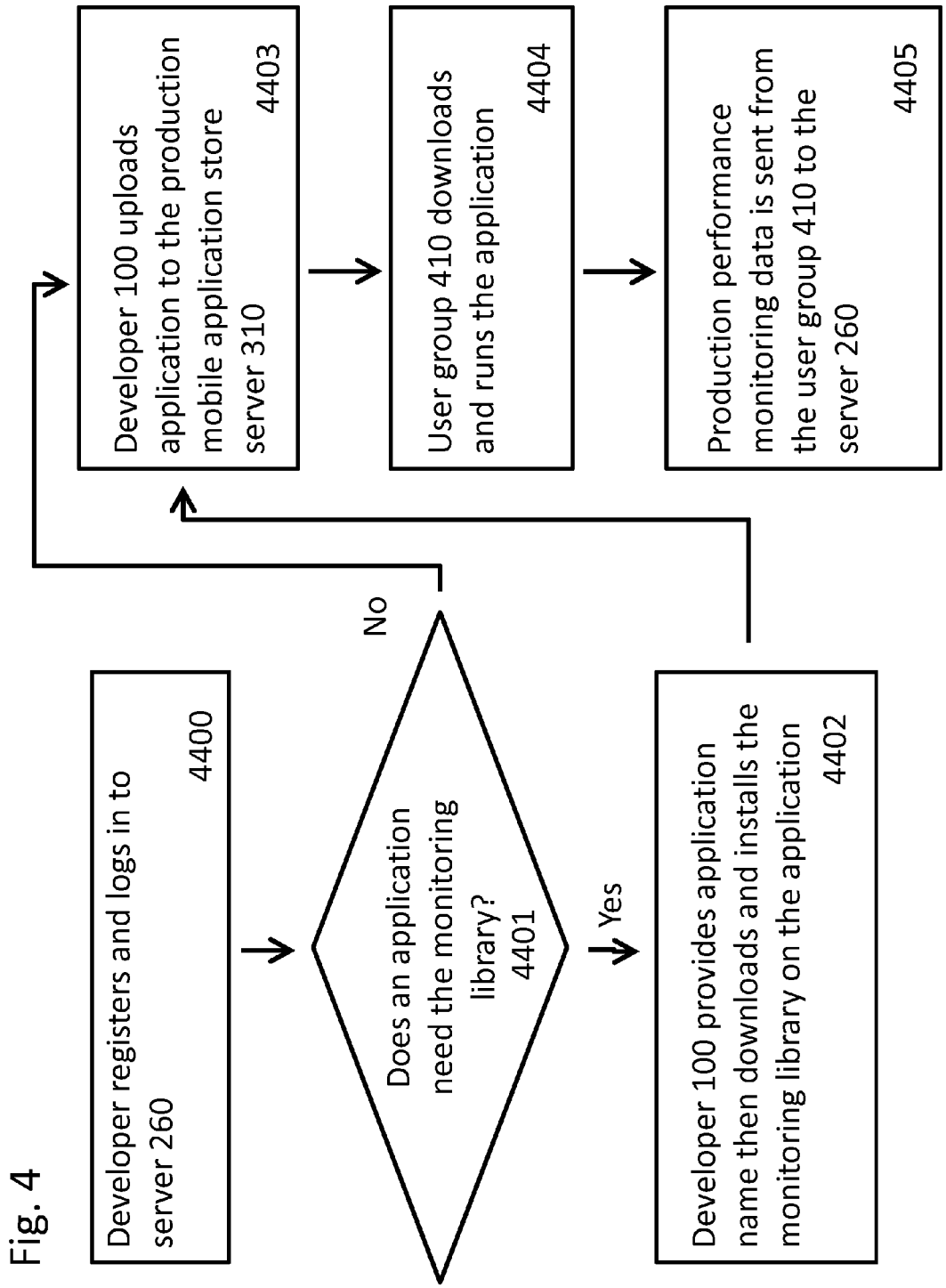
FIG. 4 illustrates installation of a performance library in a mobile application as well as deployment of the mobile application to a user group in accordance with an embodiment of the present invention.

FIG. 4 illustrates installation of a performance library in a mobile application as well as deployment of the mobile application to a user group in accordance with an embodiment of the present invention. In step 4400, a developer logs into the performance monitoring server 260 using its credentials. The developer can log in using the developer computer 100 (FIG. 1). If the developer has not logged in previously, the developer can be required to go through a registration process. During the registration process, the developer can be required to supply information such as name, mailing address, email address, and a password. The performance monitoring server 260 can then generate a unique developer identifier for that developer.

In step 4401, the developer computer 100 indicates if it needs to install the performance library on a mobile application. If so, then in step 4402 the developer computer 100 provides the application name at which point the performance monitoring server 260 creates a new data entry in the application database 309. This can include generating a new application identifier and associating it with the developer identifier from the developer database 308 for the logged in developer, then the developer computer 100 downloads the stored performance library code 301 from the performance monitoring server 260 and installs the performance library within the mobile application that is associated with or contains the newly created application identifier. Then, in step 4403, which is also reached if the benchmarking library was already installed in the application, the developer computer 100 uploads the application to the production mobile application store server 310. In step 4404, members of the user group 400 download over the network 500 the application onto their mobile devices 450 from the test mobile application store server 300. Also in step 4404, the user group 410 executes the application on their mobile devices 450. In step 4405, the mobile devices 450 send to the performance monitoring server 260 the performance information collected by the performance library. The performance monitoring server 260 then stores that data in the performance 303 database. For each mobile device, the performance data can be sent while the application is being executed on the device or after the application is executed. The data can be sent in batches periodically or can be sent in real-time as it is collected.

Figure 5:
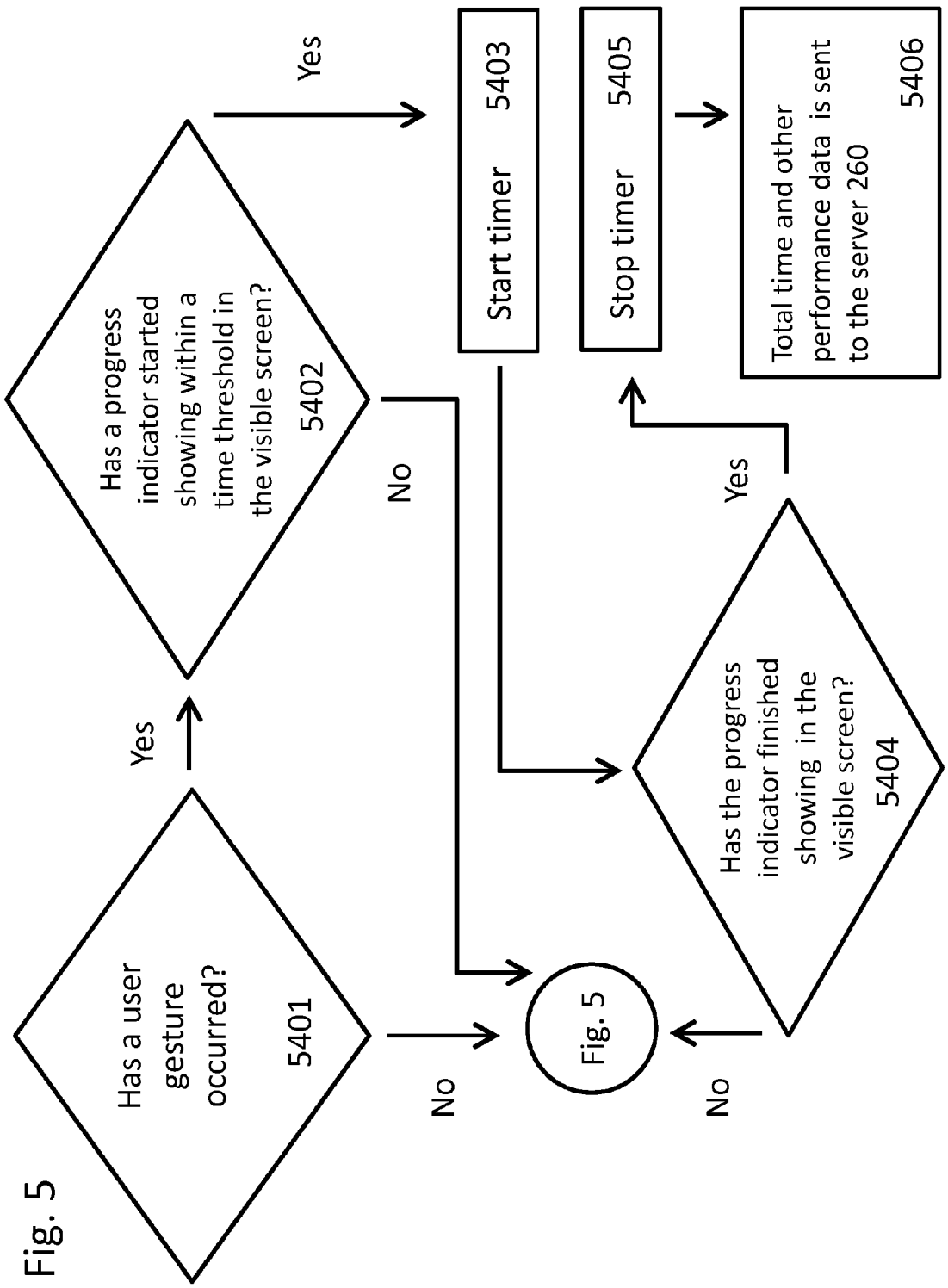
FIG. 5 illustrates capturing of wait times experienced by users in accordance with an embodiment of the present invention.

FIG. 5 illustrates capturing of wait times experienced by users in accordance with an embodiment of the present invention. Once the performance library is installed on a mobile device 450, it captures performance information, which can include the wait time experienced by members of the user group 410. In step 5401, the performance library checks if a user gesture, such as a button press or swipe, has occurred. If no user gesture occurs, then step 5401 is repeated, otherwise in step 5402 the performance library checks if a progress indicator is showing in the visible screen, preferably within a predetermined time threshold.

For example, the performance library may determine whether a user gesture occurred and a progress indicator is then shown within 2 seconds of the user gesture. If not, then step 5401 is repeated, otherwise in step 5403 a timer is started to time the length of time the progress indicator is shown on the display screen of the mobile device 450. In addition to timing the progress indicator, the performance library may also monitor additional performance data related to, for example, memory usage, network lag, disk lag, battery drain, and function runtimes during this period. In step 5404 the performance library checks if the progress indicator finished showing in the visible display screen. If not then step 5401 is repeated, otherwise in step 5405 the timer is stopped, and in step 5406 the total time that the progress indicator was shown is reported back to the performance monitoring server 260 along with any other performance data that was collected during this time related to memory usage, network lag, disk lag, battery drain, and slow function runtimes.

Thus, in accordance with FIG. 5, a timer can be started upon occurrence of a user gesture and display of a progress indicator. The timer can be stopped upon the progress indicator no longer being displayed. In an embodiment, rather than requiring a user gesture in addition to the progress indicator to start the timer, the timer may be started upon display of a progress indicator regardless of whether it is associated with a user gesture. In another embodiment, rather than commencing the timer upon display of the progress indicator, the time period may commence immediately upon receipt of the user gesture assuming the gesture is also associated with display of a progress indicator which may occur after the user gesture is received. In an embodiment, rather than ending the time period immediately upon removal of the progress indicator from the display, the time period may end upon the occurrence of a later event, such as the progress indicator being replaced with some other image or information on the display screen of the mobile device. In any event, the beginning and end of the time periods associated with display of a progress indicator are preferably determined automatically.

In an embodiment, the progress indicator may be detected only at the beginning and ending of its being displayed in the visible part of the mobile device 450 display screen. In another embodiment, the performance library checks continuously or periodically to determine whether the progress indicator is in the visible part of the mobile device 450 screen. For example, if the progress indicator was visible when it started and ended, and if the progress indicator was in the visible part of the screen for a specified percentage of the total time the progress indicator was shown, e.g. 75%, then the total time the progress indicator was shown may be reported to the performance monitoring server 220 in step 5406. Otherwise, a shorter time duration may be reported, for example, the actual time that the progress indicator was shown may be reported. The progress indicator may not appear in the display screen even if the mobile application is responding to a request if, for example, the user scrolls the display screen so that the progress indicator is not visible, or if the user switches to a different application while awaiting a response. In this case, the application may respond and the progress indicator disabled before the user returns to progress indicator.

In yet another embodiment, if the progress indicator is in the visible part of the mobile device 450 screen for more than a preset threshold then it is reported to the performance monitoring server 260 in step 5406 of FIG. 5. Otherwise, occurrence of the progress indicator may not be reported at all. The threshold can be preset by the developer 100 or by the performance monitoring server 260 in step 4402 of FIG. 4. In this way, short duration progress indicators, which do not interfere with the user experience, may not be reported for data collection purposes.

In an embodiment, multiple progress indicators can be timed for a single user gesture. These progress indicators might appear within a certain window of time beginning when a user gesture occurred, or might be progress indicators that appear before a subsequent user gesture. This may occur, for example, when multiple images are being loaded for display to the user. In this case, the entire time during which any of the progress indicators are displayed (which would represent the total time required to load the multiple images) may be reported. Alternatively, the time associated with each progress indicator may be reported (which would provide data relative to each image being loaded).

In an additional embodiment, the user action wait time is captured based on the developer 100 manually indicating where a user action starts and ends in their mobile application code. This data can then be used, for example, as described herein in connection with FIG. 7 to benchmark such user action wait times in the application against user actions of the same type in other applications. For example, if a user action for which the developer 100 indicates a start and stop point in their code is a page swipe, then the page swipe wait times can be compared to page swipes in other applications. The user action type can either be manually specified by the developer 100 or detected by the performance monitoring server 260.

In another embodiment, the performance library monitors freezes or low frame rates that occur on mobile devices 450. In this case, the performance library can monitor the frame rate and can capture the duration of time during which frame rates that are indicated as slow, for example, by the frame rate falling below a threshold such as 5 frames per second. Data collected in connection with such periods of low frame rates can be sent to the performance monitoring server 260 to be saved in the performance database 303. The periods of low frame rates can be detected and stored during periods when progress indicators are showing within a mobile application on the mobile device 450, or during any part of a user's session within a mobile application. One way to capture the number of frames per second and the duration when the frame rate is below a threshold is to monitor a frequency of write operations to a display interface of the mobile device. Periods when writes are being attempted, that is not during sleep periods, and when the writes are below a certain threshold, can then be used to indicate a low frame rate and the duration of such writes can be timed to determine how long the period of low frame rates lasts. In an embodiment, additional information is collected during such periods of low frame rates, for example, a portion of the mobile application being executed at the time may be identified or the last user input prior to the slow frame rate event may be identified. In this way, the context in which the low frame rate occurred may also be reported to enable the developer to assist the developer in determining the cause of the low frame rate.

In an embodiment, the performance monitoring library 301 can used by developers 100 in production environments, for example, after a version of the mobile application is completed and is distributed to end users. In addition, or alternatively, the performance monitoring library 301 can be used by developers 100 in development and test environments, for example, while the mobile application is undergoing test and a development and prior to distributing the mobile application to end users.

In yet another embodiment, the instrumentation that detects progress indicators and associated performance metrics, such as memory usage, network lag, disk lag, battery drain, and slow function runtimes, is inserted into the mobile application during compilation of a mobile application, for example by using a plug-in to the compiler that adds the instrumentation. Alternatively, the performance monitoring library 301 can be employed to detect progress indicators and collect performance data during runtime of the mobile application.

In an alternative embodiment of the invention in step 5402 of FIG. 5 instead of determining if a performance indicator is loaded within a certain time threshold after a user gesture, the performance library in step 5402 monitors a function call tree that is initiated by a user gesture and then only if a function in the function call tree initiates a performance indicator then the timer is started in step 5403, otherwise FIG. 5 is repeated.

Figure 6:
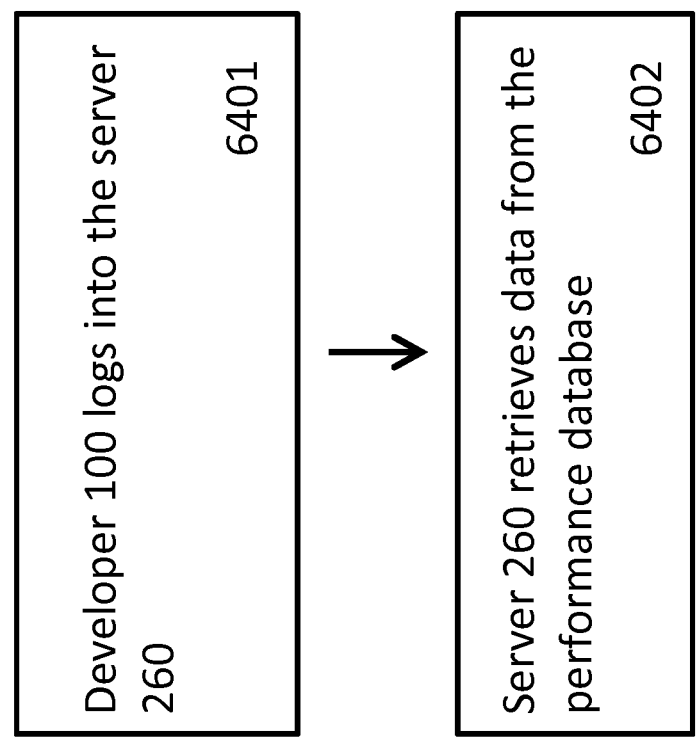
FIG. 6 illustrates retrieval of performance data in accordance with an embodiment of the present invention.

FIG. 6 illustrates retrieval of performance data in accordance with an embodiment of the present invention. FIG. 6 shows how a mobile application developer 100 can review the performance reported by the performance library. In step 6401 the developer using developer computer 100 logs into the performance monitoring server 260 over the network 500. The login credentials can be initialized in step 4402 of FIG. 4 and stored in a database on the performance monitoring server 260. In step 6402 the performance monitoring server 260 retrieves from the performance database 303 the performance data associated with the logged in developer 100.

In an embodiment, in step 6402 of FIG. 6 the developer can identify performance issues by using specific search filters. For example, the developer could search for instances when the performance indicator was shown for more than a certain time threshold, or search for instances when memory usage was above a certain available amount, or search for instances when the function runtimes where above a certain time threshold, or search for instances when disk or network lag was above a certain time threshold. In an embodiment, default filters are provided that can be changed by the developer.

In another embodiment, in step 6402 of FIG. 6, the performance monitoring server 260 identifies for the developer 100 performance data that exceed preset thresholds, set by either the developer 100 or the performance monitoring server 260. For example, this information can be provided in a report or highlighted in a report provided to the developer. As described herein, the thresholds can be related to progress indicator runtimes, memory usage, network lag, disk lag, and function runtimes. The performance monitoring server 260 can also notify the developer without requiring the developer to log into the server 260, for example by email or text message, upon occurrence of preset thresholds being surpassed by individual instances, or by a certain percentage of instances or monitored mobile devices 450.

Figure 7:
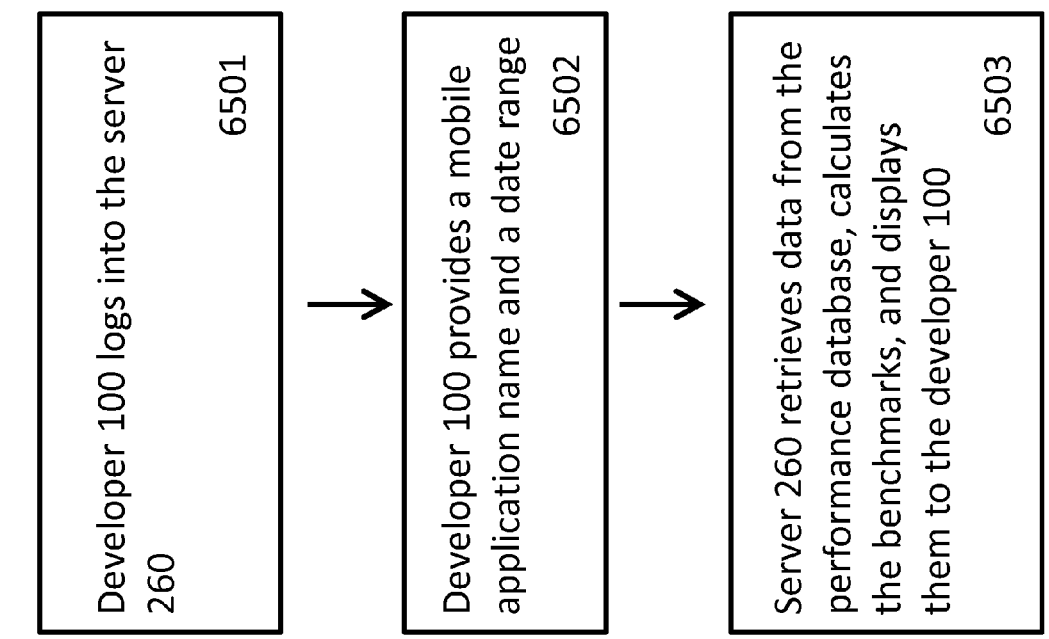
FIG. 7 illustrates retrieval of benchmarking data in accordance with an embodiment of the present invention.

FIG. 7 illustrates retrieval of benchmarking data in accordance with an embodiment of the present invention. This allows the developer to know how the performance of a user action in a mobile application compares to the performance of similar user actions in other mobile applications. In step 6501, the developer using the developer computer 100 logs into the performance monitoring server 260. The login credentials can be those created in step 4400 of FIG. 4. In step 6502, the developer selects one of the applications, and possibly also a version of the application, that is associated with that developer in the mobile application database 309. The developer may also provide a time period, such as a date range, for which to receive benchmark information. In step 6503, the performance monitoring server 260 retrieves from the performance database 303 the data for the mobile application as selected in step 6502. The server 260 may also calculate benchmarks for the data and provide results of the benchmark calculations to the developer computer 100 for display and possible further analysis. In an embodiment, the average runtime of each user action of the selected application in the selected time period is compared to the run time of actions of the same type from other applications. The data from the other applications can be limited to data collected during the specified time period or can include data from different time period(s). For example, if one of the user actions in the selected application is a newsfeed scroll action, of action type scroll, then its average runtime can be compared to the average runtime of scroll actions from other applications. The comparison can calculate a percentile to report back to the developer computer 100 that is logged in. For example the average runtime of the newsfeed scroll in the application can be reported as being in the 35th percentile compared to scroll runtimes in other applications during the selected time period. As another example, the average runtime of a page swipe action can be reported as being in the 80th percentile compared to the runtime of page swipe actions in other applications. The performance data used for benchmarking can be wait times that are automatically obtained as described in connection with FIG. 5, or can be performance data obtained in another manner, such as by manual instrumentation, or can be different types of performance data, as described herein.

As described above, developer may select a time period in step 6502 for which to receive benchmark information. In an alternative embodiment, a default time period can be set by the performance monitoring server 260.

In step 6503, in addition to communicating the benchmark information to the developer computer 100, the performance monitoring server 260 may also provide per user action performance measures including parameters related to memory 202, wireless communication 203, battery 204, processor 205, and disk 206 performance. These could be averages, distribution of performance across instances of a user action, or individual performance of user actions. This information can, for example, be used by the developer to evaluate performance of its application and to improve on the reported benchmarks.

In an embodiment, performance data used for benchmarking can indicate memory performance. For example, the data can include memory usage or memory terminations. Also, applications of the same type, e.g. games or calendar applications, can be compared to each other to obtain benchmarks (e.g., percentile of memory accesses that result in termination).

In an embodiment, the benchmarking is performed based on additional characteristics that can be specified in step 6502 such as device type, operating system type, connection type, carrier name, and geographic location of the user. Other characteristics can be, for example, instances when the memory usage is in a specified range, and/or instances in which network or disk lag are in a specified range.

In an embodiment, the time during which the frame rate was below a threshold specified can be benchmarked and compared to such duration in other applications.

In another embodiment, the total wait times or the total low frame rate time, or both, can be benchmarked compared to other mobile applications. In addition, instances of wait times or low frame rate times can be associated with various combinations of the following information which may also be reported to the developer: the type of mobile device 450 that data is collected on, its operating system version and type, its geographical location, its wireless network connection type, carrier name, a user action name, such as checkout button, a user action type such as a button press, a total runtime of the user action. In this way, the context in which the wait times or low frame rate occurred may also be reported to enable the developer to assist the developer in determining the cause of the low frame rate.

In yet another embodiment, a weighted average of all of the wait times and duration of slow frame rates in an applications can be benchmarked to the weighted average of wait times and during of slow frame rates in other applications.

In an embodiment, an application version number can be stored along with any captured performance data in the production performance 303 database. Then in step 6503 only performance data from the latest version of an application, instead or in addition to a selected time period, is used to benchmark performance compared to other applications.

In another embodiment, the performance is benchmarked by obtaining performance of an application in a development or test environment and comparing the performance to the performance of other applications in production environment.

Figure 8:
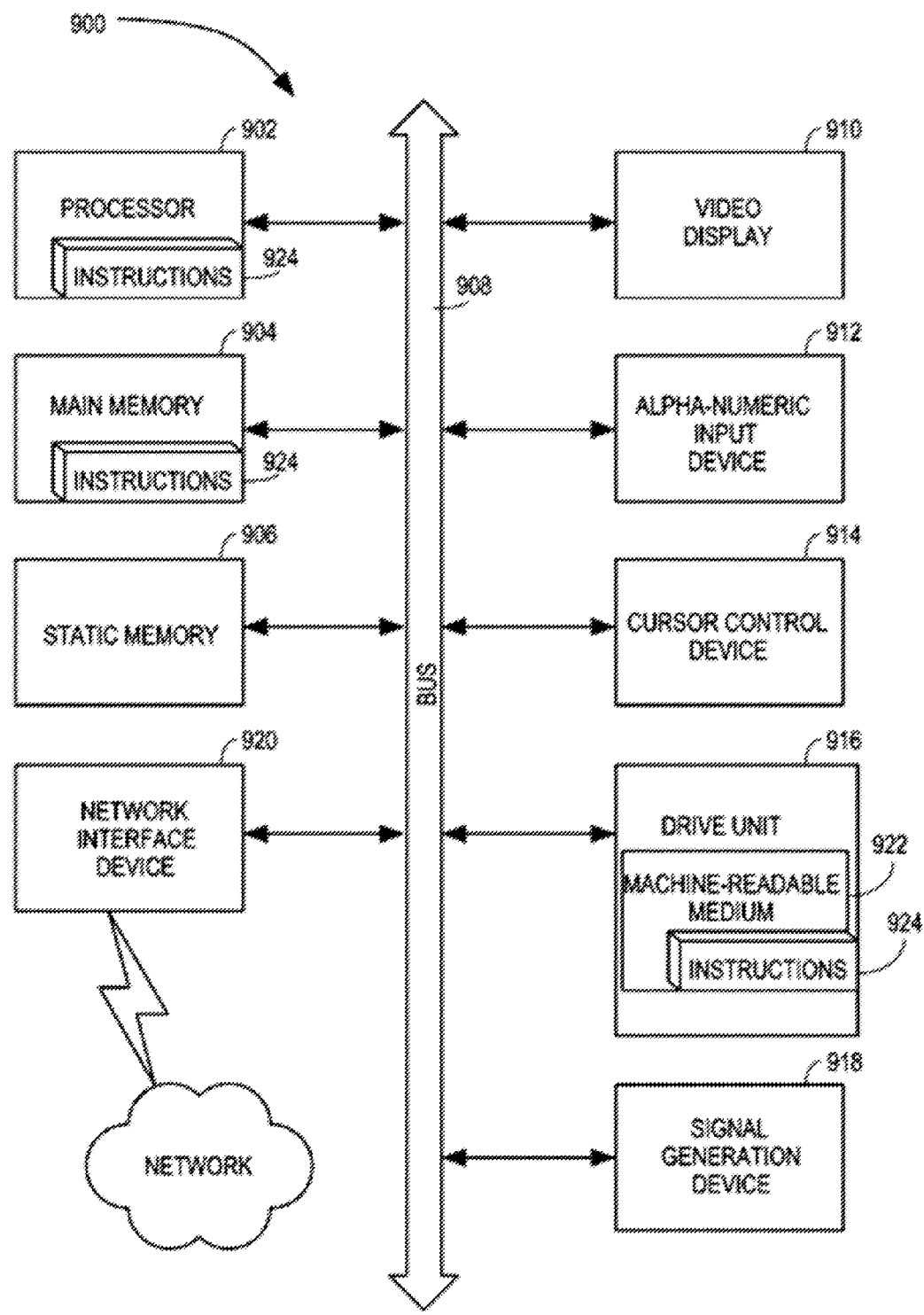
FIG. 8 illustrates a block diagram of a machine in the form of a computer system in accordance with an embodiment of the present invention

FIG. 8 illustrates a block diagram of a machine in the form of a computer system that may form a server forming part of the network system. FIG. 8 shows a machine 900 in the exemplary form of the performance monitoring server, developer computer, mobile device or other computer as hereinbefore described within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 900 includes a processor 902 (e.g., a central processing unit (CPU), a graphics processing unit (GPU) or both), a main memory 904 (e.g., read only memory (ROM), flash memory, dynamic random access memory (DRAM) such as synchronous DRAM (SDRAM) or Rambus DRAM (RDRAM), etc.), and a static memory 906 (e.g., flash memory, static random access memory (SRAM), etc.), which communicate with each other via a bus 908.

The computer system 900 may further include a video display 910 (e.g., a liquid crystal display (LCD) or a cathode ray tube (CRT)). The computer system 900 also includes an alpha-numeric input device 912 (e.g., a keyboard), a cursor control device 914 (e.g., a mouse), a disk drive unit 916, a signal generation device 918 (e.g., a speaker), and a network interface device 920.

The disk drive unit 916 includes a machine-readable medium 922 on which is stored one or more sets of instructions 924 (e.g., software) embodying any one or more of the methodologies or functions described herein. The software may also reside, completely or at least partially, within the main memory 904 and/or within the processor 902 during execution thereof by the computer system 900, the main memory 904 and the processor 902 also constituting machine-readable media.

The software may further be transmitted or received over a network 928 via the network interface device 920.

While the machine-readable medium 924 is shown in an exemplary embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding, or carrying a set of instructions for execution by the machine and that cause the machine to perform any one or more of the methodologies of the present invention. The term "machine-readable medium" shall accordingly be taken to include, but not be limited to, solid-state memories, and optical and magnetic media. It should be understood that "computer" and "computer system" as used herein can comprise a single computer or multiple computers that may be connected to one another over a network.

While certain representative embodiments and details have been shown for purposes of illustrating the invention, it will be apparent to those skilled in the art that various changes in the methods and apparatus disclosed herein may be made without departing from the scope of the invention which is defined in the appended claims.

What is claimed is:

1. A method of monitoring performance of a mobile application comprising:
    operating a mobile application on a wireless mobile device, said mobile application including a performance library configured to monitor mobile application performance;
    automatically detecting a progress indicator being displayed on a display screen of the mobile device during operation of the mobile application on the wireless mobile device, the progress indicator being displayed by the wireless mobile device while an associated user waits for an action or function to be completed by the mobile application, the performance library automatically collecting performance information associated with the wireless mobile device while the progress indicator is displayed;
    obtaining data indicative of a time duration of the progress indicator; and
    communicating the data indicative of the time duration and the performance information to a centralized server.

2. The method according to claim 1, wherein the data indicative of a time duration of the progress indicator is obtained and communicated to the centralized server only if a user gesture is detected within a specified time threshold of detection of the progress indicator.

3. The method according to claim 1, wherein the data indicative of a time duration of the progress indicator is obtained and communicated to the centralized server only if the time duration is longer than a specified time threshold.

4. The method according to claim 1, wherein said performance information includes information indicative of a context in which the progress indicator is displayed is communicated to the centralized server.

5. The method according to claim 4, wherein the information indicative of the context comprises one or more of the following: identification of a particular portion of the mobile application; identification of a most-recent user input; or identification of a type of activity occurring.

6. The method according to claim 4, wherein the information indicative of the context comprises one or more of the following: type of mobile device; operating system version and type; geographical location of the mobile device; wireless network connection type; wireless carrier name; user action name; or user action type.

7. The method according to claim 1, further comprising automatically detecting instances in which a frame rate falls below a threshold and communicating data indicative of the instances of low frame rate to the centralized server.

8. The method according to claim 7, further comprising communicating information to the centralized server that is indicative of a context in which one or more of the instances of low frame rate occurred.

9. The method according to claim 1, wherein monitoring instrumentation is inserted into the mobile application upon run-time of the mobile application wherein the monitoring instrumentation performs said automatically detecting the progress indicator.

10. The method according to claim 1, wherein monitoring instrumentation is inserted into the mobile application upon compilation of the mobile application wherein the monitoring instrumentation performs said automatically detecting the progress indicator.

11. The method according to claim 1, further comprising comparing data representative of time durations of progress indicators for the mobile application to data representative of time durations of progress indicators for one or more different mobile applications in order to obtain a benchmark for the mobile application.

12. A system for monitoring performance of a mobile application comprising:
a wireless mobile device having a mobile application equipped with instrumentation that automatically detects a progress indicator being displayed on a display screen of the mobile device during operation of the mobile application on the wireless mobile device, the progress indicator configured to be displayed while an associated user waits for an action or function to be completed by the mobile application;
a performance library configured to monitor mobile application performance and collect performance information associated with the wireless mobile device while the progress indicator is displayed;
and wherein the mobile application is configured to obtain data indicative of a time duration of the progress indicator and said performance information and to report the data and performance information to a centralized server via a network.

13. A method of monitoring performance of a mobile application comprising:
installing a first mobile application on a plurality of wireless mobile devices, said first mobile application including a performance library configured to monitor first mobile application performance and capture first mobile application performance data, including capturing said first mobile application performance data when a progress indicator is displayed by an associated wireless mobile device while an associated user waits for an action or function to be completed by the first mobile application on the associated wireless device;
installing a second mobile application on at least one wireless mobile device, said second mobile application including a performance library configured to monitor second mobile application performance and capture second mobile application performance data, including capturing said second mobile application performance data when a progress indicator is displayed by said at least one wireless mobile device while an associated user waits for an action or function to be completed by the second mobile application on at least one wireless device;
collecting, from the second mobile application, the second mobile application performance data resulting from operating the second mobile application on the at least one wireless mobile device; and
comparing relative performance of the second mobile application to performance of the first mobile application using the first mobile application performance data resulting from operating the first mobile application on the plurality of wireless mobile devices and the second mobile application performance data resulting from operating the second mobile application on the at least one wireless mobile device; and
communicating results of said comparing relative mobile application performance via a computer network.

14. The method according to claim 13, further comprising collecting mobile application performance data resulting from operating a plurality of mobile applications and wherein said comparing relative performance further comprises comparing relative performance of the second mobile application to performance of the plurality of mobile applications using the mobile application performance data resulting from operating the plurality of mobile applications.

15. The method according to claim 13, wherein the mobile application performance data comprises data indicative of wait times associated with progress indicators displayed by display screens of the wireless mobile devices.

16. The method according to claim 13, wherein the mobile application performance data comprises data indicative of low frame rates.

17. The method according to claim 13, wherein the mobile application performance data comprises data indicative of wait times associated with user gestures.

18. The method according to claim 17, wherein the user gestures are selected from the group consisting of: scrolling, flipping, swiping, and clicking a button or link.

19. The method according to claim 13, wherein the mobile application performance data comprises data indicative of memory performance.

20. The method according to claim 13, wherein said comparing relative mobile application performance comprises reporting a percentile ranking.

21. The method according to claim 20, further comprising communicating information to the centralized server that is indicative of a context in which the first and second mobile application performance data was obtained.

22. The method according to claim 21, wherein the information indicative of the context comprises one or more of the following: identification of a particular portion of the mobile application; identification of a most-recent user input; or identification of a type of activity occurring.

23. The method according to claim 21, wherein the information indicative of the context comprises one or more of the following: type of mobile device; operating system version and type of the mobile device; geographical location of the mobile device; wireless network connection type of the mobile device; wireless carrier name; user action name; or user action type.

* * * * *